United States Patent [19]

Mosely

[11] 3,889,825

[45] June 17, 1975

[54] LAYER SEPARATING APPARATUS FOR LUMBER STACKING MACHINES

[75] Inventor: Donald E. Mosely, Spokane, Wash.

[73] Assignee: Bitco, Inc., Spokane, Wash.

[22] Filed: Sept. 24, 1973

[21] Appl. No.: 399,939

[52] U.S. Cl. ............ 214/6 M; 214/1 BC; 214/6 DK
[51] Int. Cl. ............................................ B65g 57/26
[58] Field of Search .... 214/1 BC, 1 BH, 6 A, 6 DK, 214/6 FS, 6 M, 6 N; 294/33, 99 R, 99 S

[56] References Cited
UNITED STATES PATENTS

| | | | |
|---|---|---|---|
| 3,260,379 | 7/1966 | Bason | 214/6 A |
| 3,270,897 | 9/1966 | Lingl | 214/6 A |
| 3,297,171 | 1/1967 | Teago | 214/6 A X |
| 3,343,689 | 9/1967 | Fehely | 214/6 D K |
| 3,589,495 | 6/1971 | Pearne et al. | 214/6 A X |
| 3,737,053 | 6/1973 | Lunden | 214/6 DK |
| 3,738,510 | 6/1973 | Mason | 214/6 DK |

Primary Examiner—Robert J. Spar
Assistant Examiner—L. J. Paperner
Attorney, Agent, or Firm—Wells, St. John and Roberts

[57] ABSTRACT

An apparatus for separating successive layers of lumber as they are placed, by a stacking machine, on a vertical stack utilizing a number of boards selected from the layers comprising the stack instead of conventional "sticker" spacing boards. The apparatus includes a pivotable support arm held elevationally above the stack. The support arm has clamp assemblies thereon for receiving a selected number of boards from the stacking machine. The boards are individually received and gripped by the clamp assemblies. The boards are then pivoted substantially 90° and simultaneously separated by being spread apart parallel to one another. Once the boards have been located above the stack in a transverse orientation to the boards forming the stack, the clamp assemblies are released to drop the boards onto the stack.

10 Claims, 16 Drawing Figures

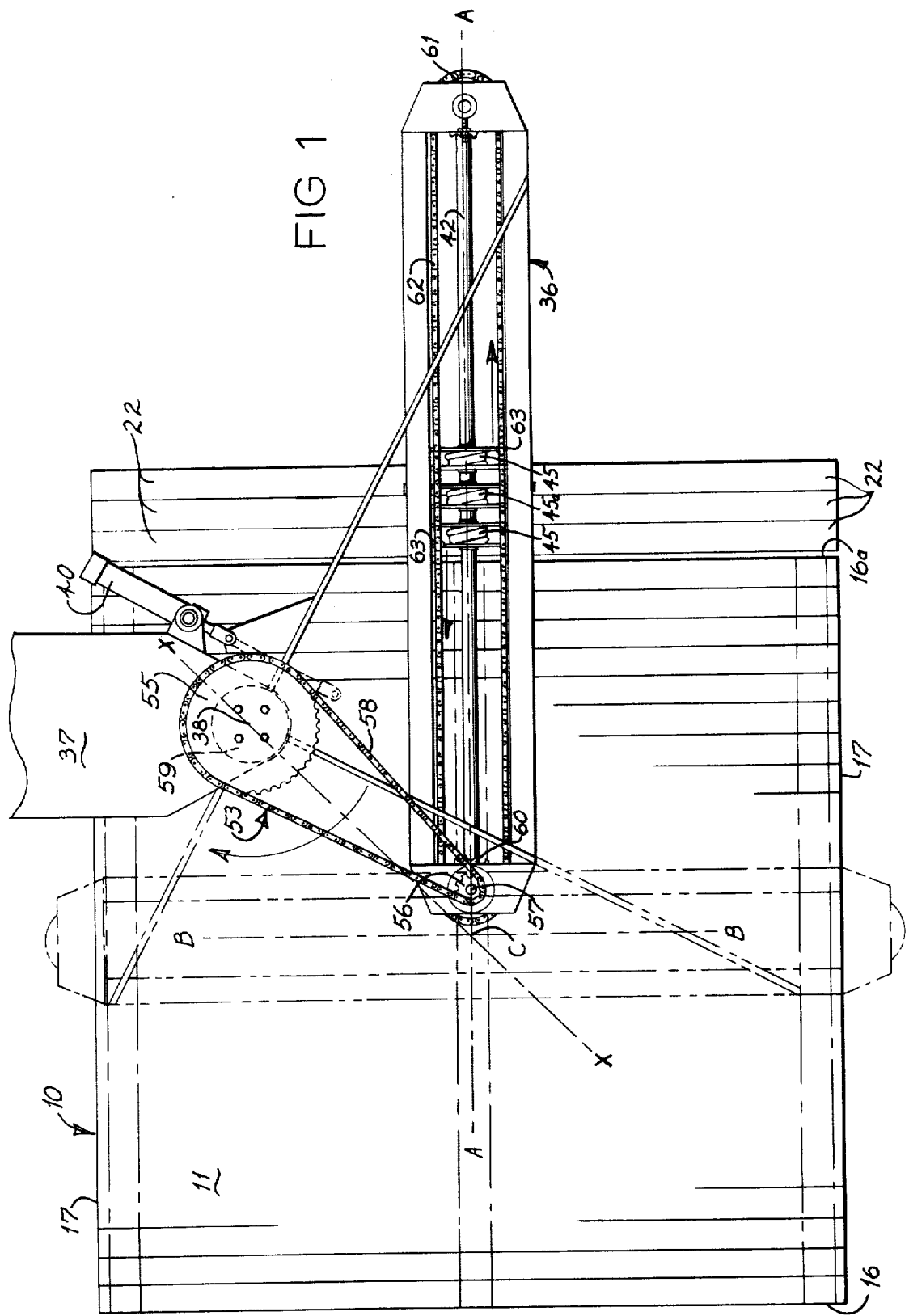

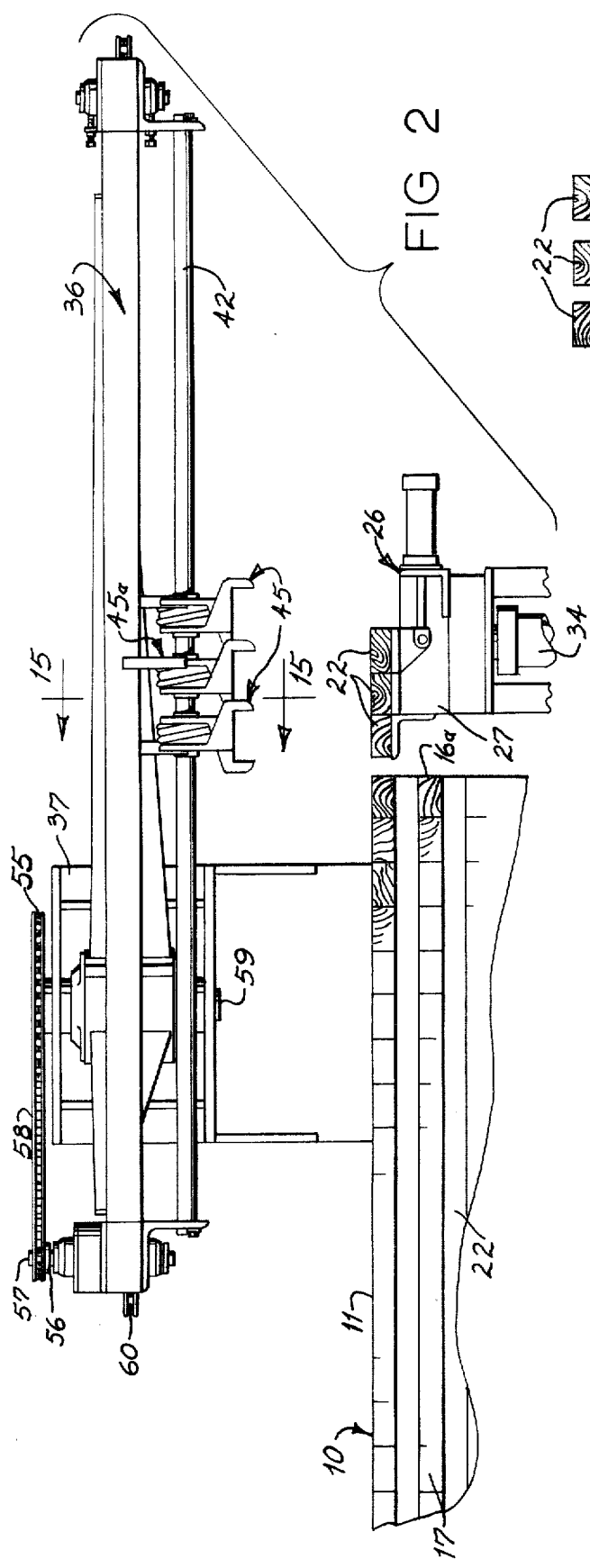
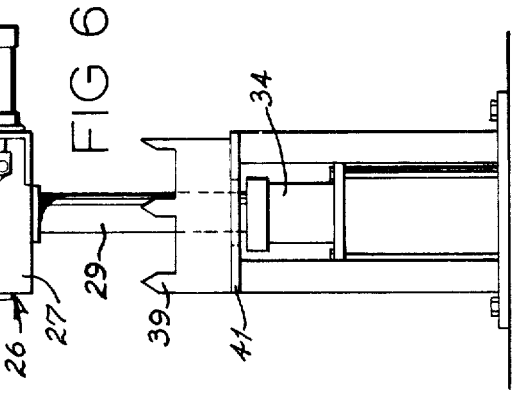
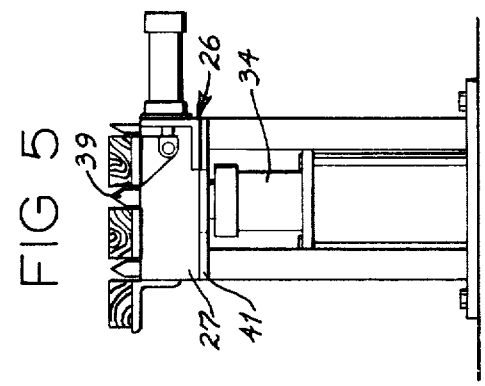
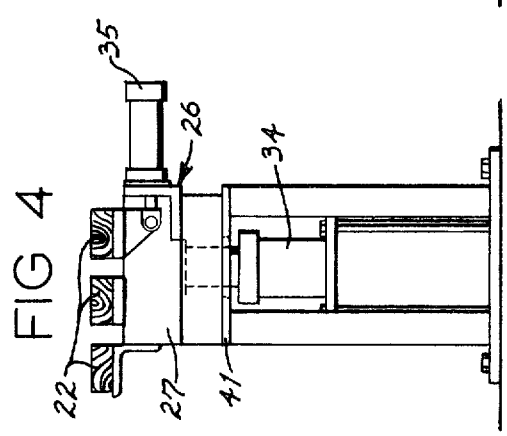
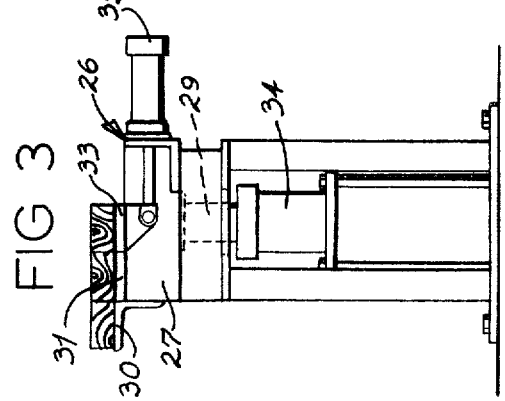

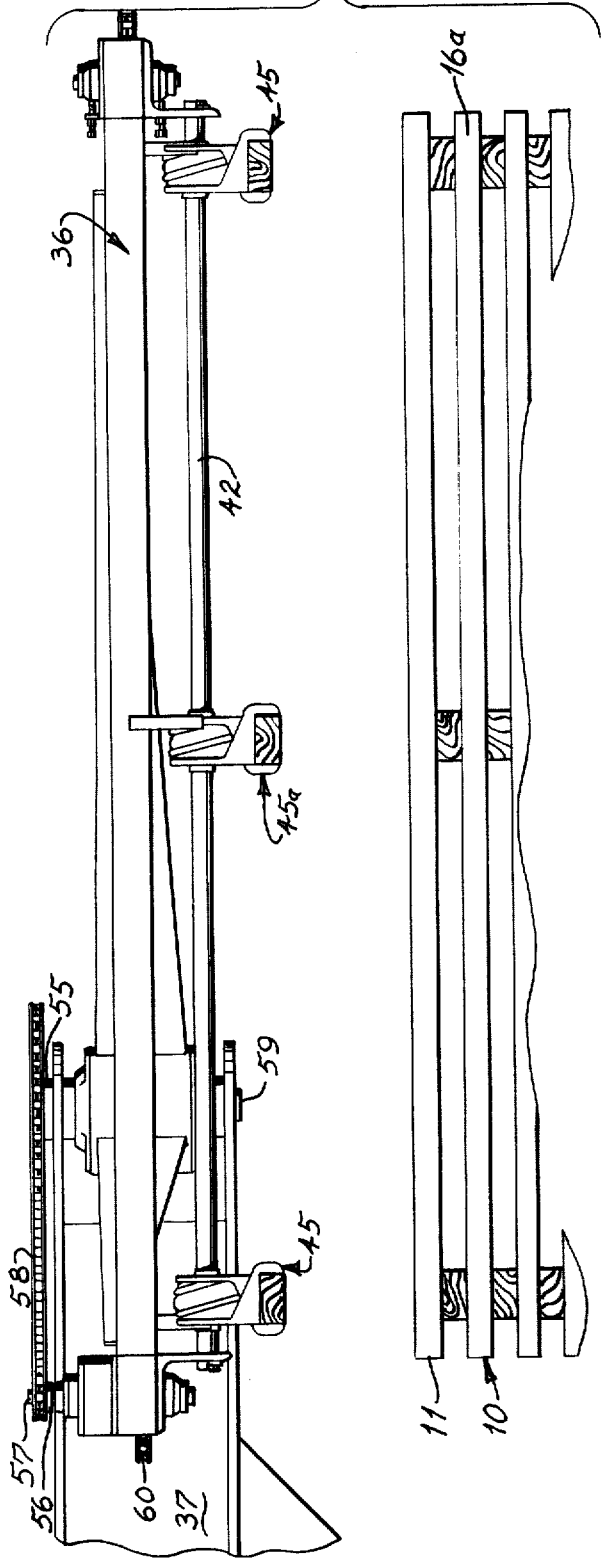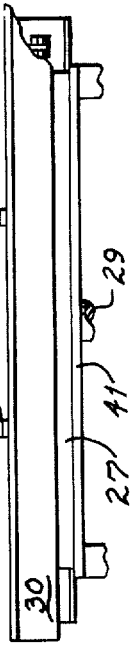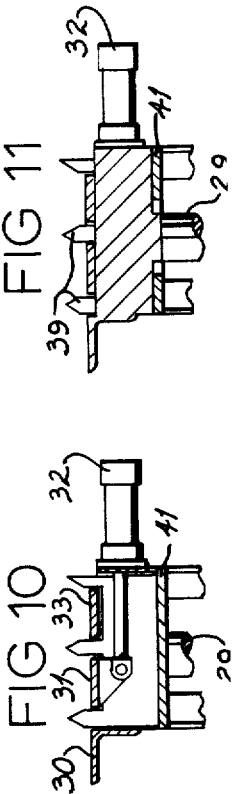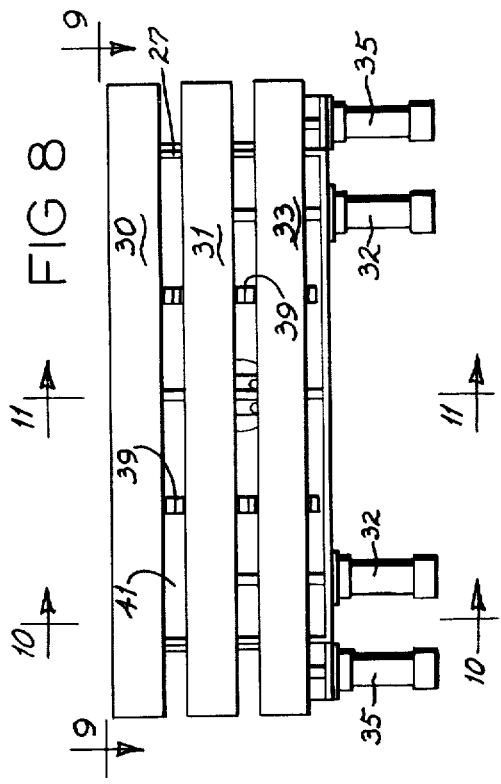

LAYER SEPARATING APPARATUS FOR LUMBER STACKING MACHINES

BACKGROUND OF THE INVENTION

The present invention relates basically to the field of lumber handling apparatus and more specifically to apparatus utilized to vertically separate individual layers of boards by placement of perpendicular spacer boards between adjacent layers forming a vertical stack.

It is usually desirable when forming a vertical stack of "green" or freshly cut lumber to leave a vertical space between the individual layers of boards forming the stack for drying purposes. Such spaces are usually created by the placement of narrow elongated slats or "stickers" between the layers. The stickers are arranged relative to the stack so that they extend across the width of the stack transverse to the lengths of the boards.

Various apparatus are known that handle such stickers independently of the stacking machine or are utilized as an integral mechanism of such stacking machines for automatically placing the stickers between the layers being formed on the stack. Such apparatus may be designed to work in response to the stacking machine but must be supplied separately with stickers, since the dimensions of such stickers are substantially different than the dimensions of the boards to be stacked. Because of this difference in size, the sticker placing apparatus must include sticker supply, delivery, and placement mechanisms independent of the board supply, delivery, and placement mechanisms of the stacking machine.

An additional problem encountered with the prior type of apparatus is that the stickers utilized for spacing the layers apart are designed solely for the purpose and therefore, if not reused, must be disposed of. This constitutes either a waste of lumber, or involves a timeconsuming recycling operation.

It may therefore be seen that it is very desirable to utilize a layer separating apparatus that: (1) may be supplied with layer separating boards by the lumber stacking machines associated therewith; (2) will utilize separating boards of dimensions identical to the dimensions of the boards forming the stack; and (3) will in no substantial manner alter the structure or operation of an existing stacking machine.

The apparatus of the present invention accomplishes the above objectives by receiving a number of layer separating boards from successive layers being deposited on a stack. These boards are first engaged by clamp assemblies and pivoted 90° over the stack. The boards are separated relative to one another as they move over the stack. They are subsequently released to fall onto the stack. The resulting positions of the layer separating boards are transverse to the boards forming the stack and spaced evenly apart along the length of the stack.

SUMMARY OF THE INVENTION

A layer separating apparatus is described herein for use in conjunction with a lumber stacking machine of the type utilized to form an upright stack of boards by placing successive layers of boards one one the other. The layer separating apparatus comprises a supply means adjacent one side of the stack for receiving and supporting a prescribed number of separating boards from the lumber stacking machine. The layer separating boards are received and supported by clamp means provided by the present invention. The boards held by the clamp means are pivoted to positions elevationally above and transverse to the boards in the stack. Spacing means is provided between the pivot means and clamp means for spacing the layer separating boards apart relative to one another along the stack. The layer separating boards are then released onto the surface of the stack by operation of clamp release means.

It is a first object of my invention to provide a layer separating apparatus that utilizes boards of dimensions similar to the boards being stacked.

It is another object of my invention to provide such a layer separating apparatus that is operable in conjunction with a lumber stacking machine to receive layer separating boards therefrom.

It is a further object to provide such a layer separating apparatus that is very simple in construction and therefore relatively maintenance free.

It is an additional object to provide such a separating apparatus that may be operated automatically in response to operation of an associated stacking machine.

It is a yet further object to provide such a layer separating apparatus that may be added onto existing stacking machines without requiring substantial modification of existing mechanisms.

These and other objects and advantages will become evident upon reading the following description, taken with the accompanying drawings, which together disclose a preferred form of my invention.

A BRIEF DESCRIPTION OF THE DRAWINGS

FIG. 1 is a plan view of the apparatus mounted adjacent one end of a stacking machine;

FIG. 2 is a side elevational view of the apparatus as seen from the right in FIG. 1;

FIGS. 3–6 are detailed operational elevational views of the board supply means;

FIG. 7 is an elevational view similar to FIG. 2 showing a different operational position of the apparatus;

FIG. 8 is a plan view of the supply means;

FIG. 9 is an elevational view taken along line 9—9 in FIG. 8.

FIG. 10 is a cross-sectional view taken along line 10—10 in FIG. 8;

FIG. 11 is a cross-sectional view taken along line 11—11 in FIG. 8;

DETAILED DESCRIPTION OF A PREFERRED EMBODIMENT

Figure 12:
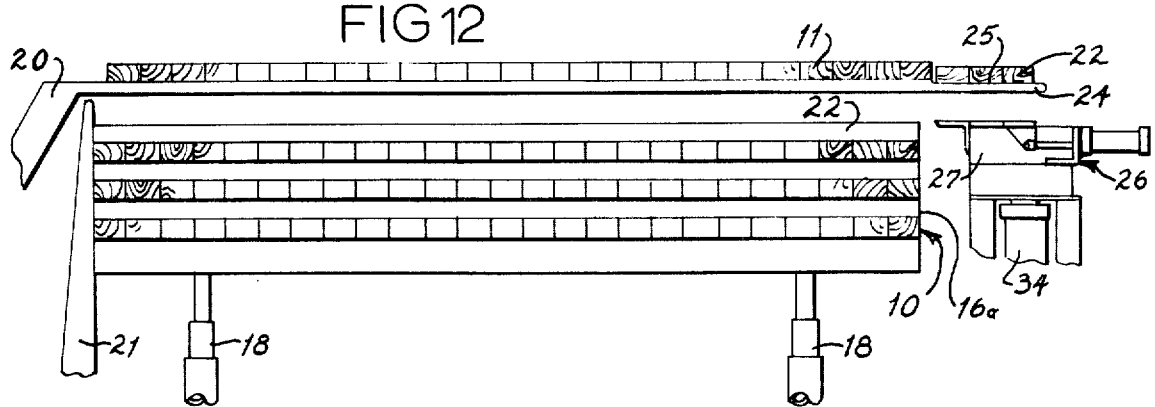
FIGS. 12, 13 and 14 are diagrammatic operational views illustrating the placement of a layer of boards on the stack and of a prescribed number of layer separating boards onto the supply means.

Referring now to FIGS. 1, 2 and 12-14 of the drawings, the apparatus of the present invention is shown adjacent an upright stack of boards 10. The stack 10 is formed by an automatic lumber stacking machine that is operable to move successive layers 11 of boards onto one another to form an upright stack 10. The successive layers are delivered to the stack 10 by means of fork arms 20 (FIGS. 12–14) which lift successive layers 11 and move each layer 11 to the right as shown in FIG.

12 over an upright stripping member 21. Once positioned over the stack, the forks are operated to lower each layer 11 onto the stack (FIG. 13) and subsequently retract to the left to bring the layer against the stripping member 21 (FIG. 14) to strip the layer onto the stack. As the stack is formed, it is progressively lowered by supporting rams 18.

The stack 10 for the purposes of the present invention is substantially square, having a rear side 16 and front side 16a formed along the lengths of the boards comprising the stack, and ends 17 formed by the ends of the boards in the stack.

Figure 13:
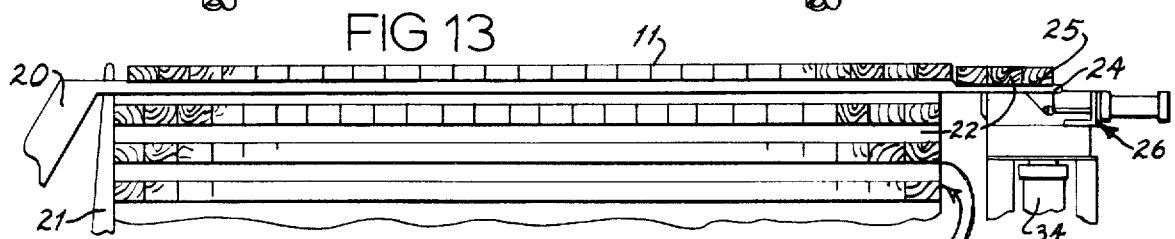
Figure 14:
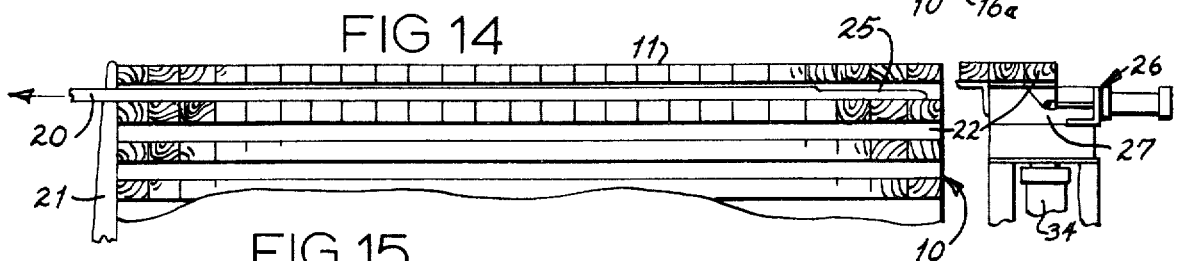

The layer separating apparatus receives a prescribed number of layer separating boards 22 as each layer 11 is delivered onto the stack 10. Three such boards 22 are used in the illustrated machine. This is accomplished by delivery means comprising extensions 24 fixed to the outer ends of the fork arms 20. The extensions 24 include upwardly facing surfaces 25 that are located elevationally below the layer support surface of the fork arms 20. As shown in FIGS. 12–14, the extensions 24 are utilized to receive three layer separating boards 22 during each operational cycle of the stacking machine in which a layer of boards 11 is delivered and deposited on the stack 10. The elevational difference between the layer separating boards 22 and the boards forming the layer 11 is an important feature of this invention and will be discussed in greater detail below.

The layer separating boards 22 are delivered from the extensions 24 onto a support table 26 of a layer separating board supply means. The support table 26 is mounted to a horizontal frame 27 that is in turn mounted to the piston shaft 29 of an elevating cylinder 34.

The table 26 is comprised of several longitudinal sections. A first table section 30 (FIGS. 3 and 8) is fixed to the frame 27. A second table section 31 is slidably mounted on the frame 27 adjacent the first section 30. A spaced set of cylinders 32 are connected between the frame 27 and the second table section 31. The cylinders 32 enable section 31 to be shifted between a first position as shown in FIG. 3 abutting the first section 30, and a second position as shown in FIG. 4 slightly spaced from the first section 30. A third table section 33 is provided adjacent the second table section 31 and is also slidably carried by the frame 27. A set of cylinders 35 are mounted between frame 27 and the third table section 33. The cylinders 35 facilitate movement of the table section 33 between a first position shown in FIG. 3 wherein section 33 abuts the second section 31, and a second position wherein the third section 33 is spaced slightly from the second section 31. Operation of the cylinders 32 and 35 separates the three boards received from the extensions 24 so that each may be individually gripped and handled by the clamp means of the present invention.

To further assure accurate positioning of the layer separating boards 22 on the table 26, a number of upright index fingers 39 are provided on a stationary base 41. As shown in FIGS. 3–6, the purpose of the layer separating board supply means is to first receive the three layer separating boards 22 with one board 22 supported on each of the three sections 30, 31 and 33. The cylinders 32 and 35 are then activated to move the boards 22 apart as shown in FIG. 4. To insure that the boards 22 are properly positioned on the support table 26, the cylinder 34 is activated to lower the table 26, bringing the boards downward between index fingers 39 provided on stationary base 41. The index fingers 39 insure that boards 22 are properly aligned along the respective table sections. Once properly aligned, the cylinder 34 is again activated to extend (FIG. 6) to elevate boards 22 above the stack 10 for access by the clamp means of the present invention.

In order to insure effective operation of the supply means described above, the three layer supporting boards 22 should be spaced outwardly a short distance from the front side 16a of the stack 10. This is accomplished upon delivery of the boards 22 by the extensions 24 on the fork arms 20. Since the upward facing support surface 25 of the extensions 24 are elevationally below the layer support surfaces of the fork arms 20, the layer separating boards 22 held thereby will engage the support table 26 before the layer 11 engages the top of the stack 10. Therefore, as the fork arms continue to lower, the extensions 24 are clear of the layer separating boards 22. This enables the boards to rest on the support table 26 as the fork arms are retracted, bringing the layer 11 against the stripping members 21 and thereby spacing the layer 11 from the separating boards 22. This is illustrated in FIGS 12–14.

The cylinder 34 is utilized as means for elevating the positioned layer separating boards 22 above the stack for access by clamping means on a pivotable support arm 36. The support arm 36 is included as an element of a pivot means for receiving and pivoting the layer separating boards 22 from the position shown in FIG. 1 substantially parallel to the side 16 of the stack to positions (shown in dashed lines in FIG. 1) wherein the separating boards 22 are located transverse to the lengths of the boards forming the stack 11 or parallel to the ends 17 of the stack 11.

The support arm 36 is pivotably carried above the stack by a stationary frame 37. Pivotal movement of the support arm 36 is centered about a pivot axis 38 as shown in FIG. 1. The location of the pivot axis 38 is essential to the operation of the invention. It facilitates pivotal movement of the layer separating boards 22 from the positions adjacent the side of the stack to centered positions along the stack so that the ends of the separating boards 22 are even with the stack sides 16, 16a The location of the pivot axis 38 is determined primarily from the length of the boards being stacked. The axis commonly lies along a vertical plane X—X bisecting an angle formed by a first plane A—A parallel to the ends 17 of the stack and passing through the center C of the stack surface, and a second plane B—B extending through the center C and parallel to the stack sides 16. These planes are designated in FIG. 1.

The support arm 36 is operated to pivot about axis 38 by drive means comprising a cylinder 40 connected between the support arm 36 and the frame 37. Operation of cylinder 40 serves to pivot the support arm 36 between the two alternate positions illustrated in FIG. 1 by solid and dashed lines. Support arm 36 also includes an elongated slide shaft 42 for mounting the individual clamp assemblies 45.

Figure 15:
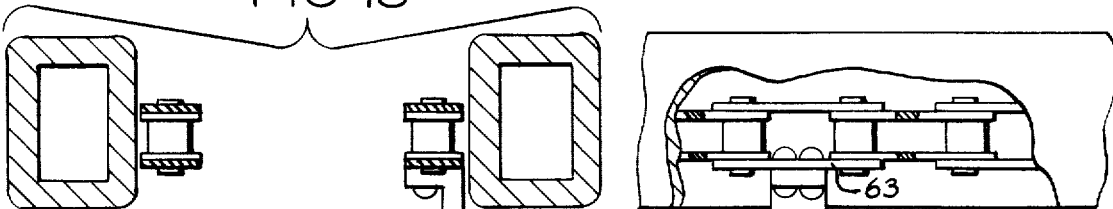
FIG. 15 is an enlarged cross-sectional view taken along line 15—15 in FIG. 2.
Figure 16:
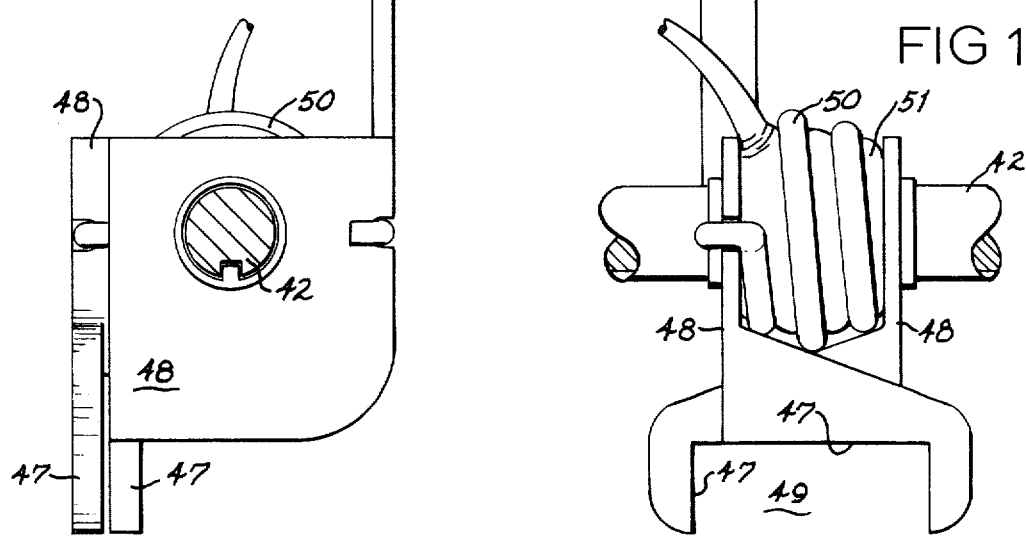
FIG. 16 is an elevational view as seen from the left in FIG. 15.

Two movable clamp assemblies 45 and one stationary clamp assembly 45a are illustrated in FIGS. 1 and 2 mounted to the slide shaft 42. The clamp assemblies are centered longitudinally along the length of support arm 36. The central clamp assembly 45a is fixed to the support arm 36 and is thereby stationary relative to the remaining two movable clamp assemblies 45. FIGS. 15 and 16 illustrativelly a clamp assembly which is comprised of a pair of clamp plates 48 slidably carried on shaft 42. Each clamp plate 48 carries an integral gripping surface 47. The gripping surfaces 47 of each clamp assembly extend toward one another so that a scissors effect is obtained when the individual gripping surfaces 47 are moved toward or away from one another along the shaft 42. The gripping surfaces 47 form a downwardly open recess 49 complementary in shape to the cross-sectional configuration of the separating boards 22.

A tension spring 50 is connected between each set of clamp plates 48 to normally urge the gripping surfaces 47 away from each other. The tension created by spring 50 is overcome by operation of inflatable air bags 51 also located between the clamp plates 48. The air bags 51 are selectively operable to separate the clamp plates 48 and thereby move the gripping surfaces 47 inward toward one another. The inflatable bags 51 are utilized therefore to operate the gripping surfaces 47 to selectively grip layer separating boards 22 supplied by the layer separating supply means.

The tension spring 50 acts as a clamp release means that is operable, as the air bags 51 are deflated, to move the gripping surfaces 47 apart thereby releasing the separating boards 22.

The layer separating boards 22 are received by the clamp means, and subsequently are pivoted approximately 90° by the cylinder 40, while being simultaneously separated along the support arm by spacing means that is best illustrated in FIG. 1. The spacing means is basically comprised of a linkage means 53 mounted between the frame 37 and support arm 36, and a motion transmitting means 54.

The linkage means 53 includes a stationary sprocket 55 mounted to a shaft 59 on the frame 37. The sprocket 55 is positioned on the shaft 59 so that it is centered on the axis 38. A rotatable sprocket 56 is mounted to a shaft 57 rotatably carried by the support arm 36 to one side of the clamp assemblies 45, 45a. An endless chain 58 is engaged about the sprockets 55 and 56. Since sprocket 55 is stationary and the sprocket 56 is rotatable about the axis of shaft 57, it follows that pivotal movement of the support arm between the illustration positions would affect rotation of the rotatable sprocket 56 and therefore the shaft 57.

The rotating motion of the shaft 57 is transferred to the motion transmitting means which includes a clamp drive sprocket 60, also fixed to shaft 57. Clamp drive sprocket 60 is connected to an idler sprocket 61 located on the support arm 36 on the opposite side of the clamp assemblies 45 by an endless chain 62. Rotational movement of shaft 57 causes movement of the two flights of chain 62 in opposite directions as designated by the arrows in FIG. 1. The movable clamp assemblies 45 are connected to opposite flights of the chain 62 by connecting members 63. Any movement imparted to the chain 62 is also imparted to the movable clamp assemblies 45. Therefore, as the support arm 36 is pivoted to the position shown in dashed lines, the movable clamp assemblies are moved apart. As the support arm moves to the position shown in solid lines, the movable clamp assemblies 45 are simultaneously moved translationally along the slide shaft 42 toward the central stationary clamp assembly 46.

The operation of the present invention in summary may best be understood first with reference to FIGS. 12–14. In each operational cycle of the lumber stacking machine, the fork arms 20 are brought over the stack 10 carrying a layer of boards 11 thereon with three layer separating boards 22 supported on the fork extensions 24. The fork arms are lowered to deposit the separating boards 22 onto table 26, and are then retracted to strip the layer 11 against the stripping members 21. The layer separating boards 22 held on the support table 26 are then positioned as illustrated in FIGS. 3, 4 and 5 by operation of the cylinders 35 and 32, and by the index fingers 39. Once positioned, the layer separating boards 22 are then lifted by means of the elevating cylinder 34 into the recesses 49 of the respective clamp assemblies 45 and 45a presently located above.

As the separating boards 22 reach the clamp assemblies the air bags 51 are inflated to move the gripping surfaces 47 together against the boards held in the recesses 49. After being gripped by the clamp assemblies 45, the boards 22 are pivoted by operation of the cylinder 40 to the position illustrated by dashed lines in FIG. 1. As the support arm 36 is pivoted, the movable clamp assemblies 45 separate until the two outside separating boards 22 are lcoated elevationally above and adjacent the ends 17 of the stack 10. Upon reaching the position wherein the separating boards 22 are held substantially perpendicular to the sides 16 of the stack, the inflatable bags 51 are deflated to allow the tension springs 50 to open the clamp assemblies and drop boards 22 gravitationally onto the surface of the stack. After the boards 22 have been released, the cylinder 50 is again activated to pivot the support arm back to the position illustrated in solid lines in FIG. 1 in preparation for the next sucessive set of layer separating boards.

It may have become obvious from the above description and attached drawings that various changes and modifications may be made therein without departing from the intended scope of this invention. Therefore, only the following claims are to be taken as definitions of the invention.

What I claim is:

1. A layer separating apparatus for use in conjunction with a lumber stacking machine of the type utilized to form an upright stack of boards by placing successive layers of boards one on another with the boards being arranged lengthwise between ends of the stack, said layer separating apparatus comprising:

a support table for receiving and supporting a prescribed number of layer separating boards;

a layer separating board positioning means for locating the layer separating boards at specific positions on the support table;

means for elevating the layer separating boards to an elevation above the stack;

clamp means for receiving and supporting layer separating boards from the support table;

pivot means for moving the layer separating boards held by the clamp means from the support table to positions elevationally above and transverse to the boards in the stack;

spacing means associated between the pivot means and clamp means for spacing the layer separating boards apart relative to one another along the length of the stack; and clamp release means for releasing the layer separating boards onto the stack.

2. The apparatus set out in claim 1 wherein the lumber stacking machine includes fork arms operated to (A) move successive layers of boards elevationally over a stack; (B) retract to bring the layer of boards against an abutment and (C) continue to retract to thereby strip the layer of boards onto the stack;
  wherein the layer separating apparatus further comprises:
  layer separating board delivery means associated with the fork arms for delivering layer separating boards to the support table as the fork arms deposit a layer of boards onto the stack.

3. The apparatus set out in claim 2 wherein the prescribed number of layer separating boards are identical in dimension to and taken from the boards being stacked.

4. The apparatus set out in claim 1 wherein the pivot means includes:
  an elongated horizontal support arm located elevationally over the stack for pivotal movement about a vertical pivot axis;
  a framework supporting the pivot arm;
  drive means mounted between the support arm and framework, operable to pivot the support arm between a first position substantially perpendicular to the lengths of the boards in the stack, and a second position substantially parallel with the lengths of the boards in the stack.

5. The apparatus set out in claim 4 wherein the pivot axis is located along a vertical plane bisecting an angle formed by vertical reference planes passing through the center of the upward facing surface of the stack, said reference planes comprising a first reference plane parallel to the boards forming the stack and a second reference plane perpendicular to the first reference plane.

6. The apparatus set out in claim 4 wherein the clamp means comprises a number of clamp assemblies equal to the prescribed number of layer separating boards mounted to the support arm for pivotal movement therewith about said pivot axis and wherein at least one clamp assembly is mounted for translational movement along the support arm.

7. The apparatus set out in claim 6 wherein the spacing means comprises:
  linkage means operatively connected between the framework and the support arm for movement in response to movement of the support arm about said pivot axis; and
  motion transmitting means operatively connected between the linkage means and the clamp means for moving the clamp assemblies along the support arm in response to movement of the support arm about the pivot axis.

8. The apparatus set out in claim 7 wherein the linkage means comprises:
  a stationary sprocket fixed to the support frame coaxial with the pivot axis;
  a rotatable sprocket mounted to an upright shaft rotatably held by the support arm to one side of the clamp assemblies for pivotal movement about an axis radially spaced from the pivot axis; and
  an endless chain extending around the stationary and pivotable sprocket.

9. The apparatus set out in claim 8 wherein the motion translating means comprises:
  a clamp drive sprocket mounted to the upright shaft for rotational movement therewith;
  an idler sprocket rotatably carried by the support arm and spaced from the clamp drive sprocket to the opposite side of the clamp assemblies;
  an endless chain extending about the clamp drive sprocket and the idler sprocket; and
  connector members extending between the chain and at least one of the clamp assemblies mounted for translational movement along the support arm.

10. The apparatus set out in claim 6 wherein each clamp assembly is comprised of opposed gripping surfaces;
  wherein the clamp release means comprises a first biasing means included in each clamp assembly for urging the gripping surfaces apart; and
  wherein the clamp means further includes a second biasing means mounted to each clamp assembly and operable to overcome the bias of the first biasing means and thereby urge the gripping surfaces together.

* * * * *